US012679036B2

(12) United States Patent
Lin et al.

(10) Patent No.: US 12,679,036 B2
(45) Date of Patent: Jul. 14, 2026

(54) 3D PRINTER

(71) Applicants: PHROZEN TECH CO., LTD.,
Hsinchu City (TW); DONGGUAN CITY PHROZEN TECH CO., LTD.,
Dongguan City (CN)

(72) Inventors: Wei-Chun Lin, Taichung City (TW);
Chang Hsien Li, Hsinchu City (TW);
Shang Zheng, Handan City (CN)

(73) Assignees: PHROZEN TECH CO., LTD.,
Hsinchu City (TW); DONGGUAN CITY PHROZEN TECH CO., LTD.,
Dongguan City (CN)

( * ) Notice: Subject to any disclaimer, the term of this patent is extended or adjusted under 35 U.S.C. 154(b) by 164 days.

(21) Appl. No.: 18/762,507

(22) Filed: Jul. 2, 2024

(65) Prior Publication Data

US 2025/0018656 A1 Jan. 16, 2025

(30) Foreign Application Priority Data

| Jul. 12, 2023 | (CN) | .......................... | 202321834683.1 |
| Jul. 19, 2023 | (CN) | .......................... | 202310891317.8 |
| Jul. 19, 2023 | (CN) | .......................... | 202321914336.X |
| Aug. 7, 2023 | (CN) | .......................... | 202310988326.9 |

(51) Int. Cl.
| *B29C 64/386* | (2017.01) |
| *B29C 64/118* | (2017.01) |
| *B29C 64/295* | (2017.01) |
| *B29C 64/321* | (2017.01) |

| *B33Y 30/00* | (2015.01) |
| *B33Y 50/00* | (2015.01) |

(52) U.S. Cl.
CPC .......... *B29C 64/386* (2017.08); *B29C 64/118* (2017.08); *B29C 64/295* (2017.08); *B29C 64/321* (2017.08); *B33Y 30/00* (2014.12); *B33Y 50/00* (2014.12)

(58) Field of Classification Search
None
See application file for complete search history.

(56) References Cited

U.S. PATENT DOCUMENTS

| 2013/0161439 A1 * | 6/2013 | Beery | .................... B65H 49/36 |
| | | | 242/396.1 |
| 2017/0282462 A1 * | 10/2017 | Abe | ...................... B29C 64/188 |
| 2020/0198239 A1 * | 6/2020 | Erdman | ............... B29C 64/118 |
| 2021/0053293 A1 * | 2/2021 | MacNeish, III | ...... B29C 64/118 |
| 2021/0323231 A1 * | 10/2021 | Padgett | .................. B33Y 40/10 |

FOREIGN PATENT DOCUMENTS

| CN | 111674041 A | * | 9/2020 | ............. B29C 64/20 |
| WO | WO-2017198335 A1 | * | 11/2017 | ............. B08B 7/028 |

* cited by examiner

*Primary Examiner* — Larry W Thrower
*Assistant Examiner* — Xinwen Ye
(74) *Attorney, Agent, or Firm* — Maschoff Brennan

(57) ABSTRACT

A 3D printer includes a frame, a carrier, a nozzle and a detection device. The carrier is fixed to the frame. The nozzle is movably disposed on the frame. The detection device includes a piezoelectric ceramic sheet and a position detector. The piezoelectric ceramic sheet is in contact with the carrier. The position detector is disposed on the nozzle.

18 Claims, 10 Drawing Sheets

3D PRINTER

CROSS-REFERENCE TO RELATED APPLICATIONS

This non-provisional application claims priority under 35 U.S.C. § 119 (a) on Patent Application No(s). 202310891317.8 filed in China on Jul. 19, 2023, Patent Application No(s). 202310988326.9 filed in China on Aug. 7, 2023, Patent Application No(s). 202321834683.1 filed in China on Jul. 12, 2023, Patent Application No(s). 202321914336.X filed in China on Jul. 19, 2023, the entire contents of which are hereby incorporated by reference.

TECHNICAL FIELD

The disclosure relates to a 3D printer.

BACKGROUND

A piezoelectric ceramic sheet is an electronic sound generating component. The piezoelectric ceramic sheet includes two copper round electrodes and a piezoelectric ceramic material located therebetween. When an AC audio signal is provided to the copper round electrodes, the piezoelectric ceramic material will vibrate according to the frequency of the signal, thereby producing sound. Although the piezoelectric ceramic sheet has high sensitivity, as the size of the piezoelectric ceramic sheet increases, the piezoelectric ceramic sheet is easily influenced by the external environmental factors and lose accuracy due to its high sensitivity. Therefore, piezoelectric ceramic sheet is generally used as a buzzer.

A 3D printer, especially FDM (i.e., Fused Deposition Modeling) 3D printer, requires a correct position to perform printing to achieve high precision when printing three-dimensional objects. Therefore, how to choose a position detector having high sensitivity, high accuracy and is easy for installation is a very important issue in the 3D printing industry.

SUMMARY

The disclosure provides a 3D printer for improving accuracy of detection.

One embodiment of the disclosure provides a 3D printer. The 3D printer includes a frame, a carrier, a nozzle and a detection device. The carrier is fixed to the frame. The nozzle is movably disposed on the frame. The detection device includes a piezoelectric ceramic sheet and a position detector. The piezoelectric ceramic sheet is in contact with the carrier. The position detector is disposed on the nozzle.

According to the 3D printer as disclosed in the above embodiment, the 3D printer has the detection device, and the detection device includes the piezoelectric ceramic sheet and the position detector. When the nozzle approaches the carrier, the position detector produces the approaching signal, and then the piezoelectric ceramic sheet produces the vibration signal when the nozzle contacts the carrier, such that the piezoelectric ceramic sheet is determined to detect the real vibrations by these two signal, thereby solving the issue of the detection of the piezoelectric ceramic sheet easily be influenced by the external environment. As a result, the size of the piezoelectric ceramic sheet is no longer limited, and may be increased according to the size of the 3D printer or the size of a print object for meeting the accuracy requirement of the detection.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
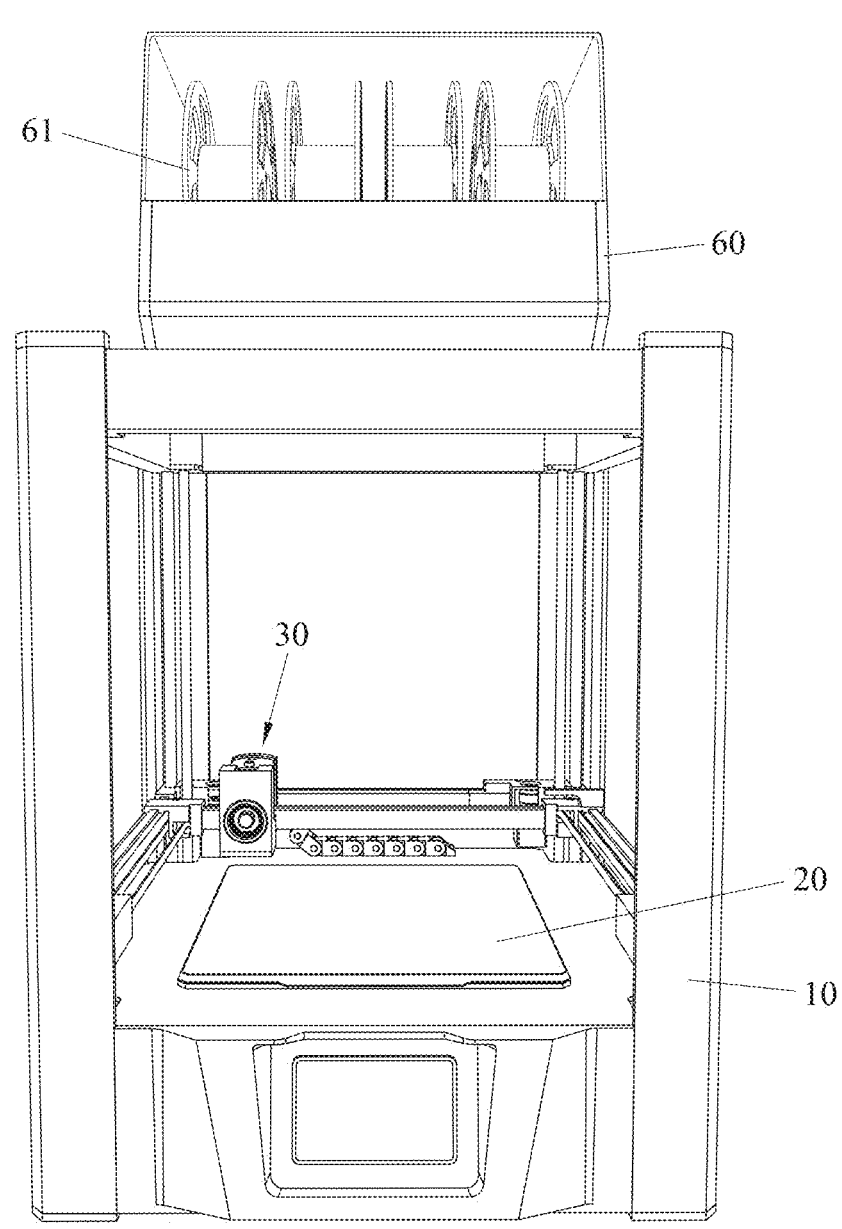
FIG. 1 is a perspective view of a 3D printer according to one first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
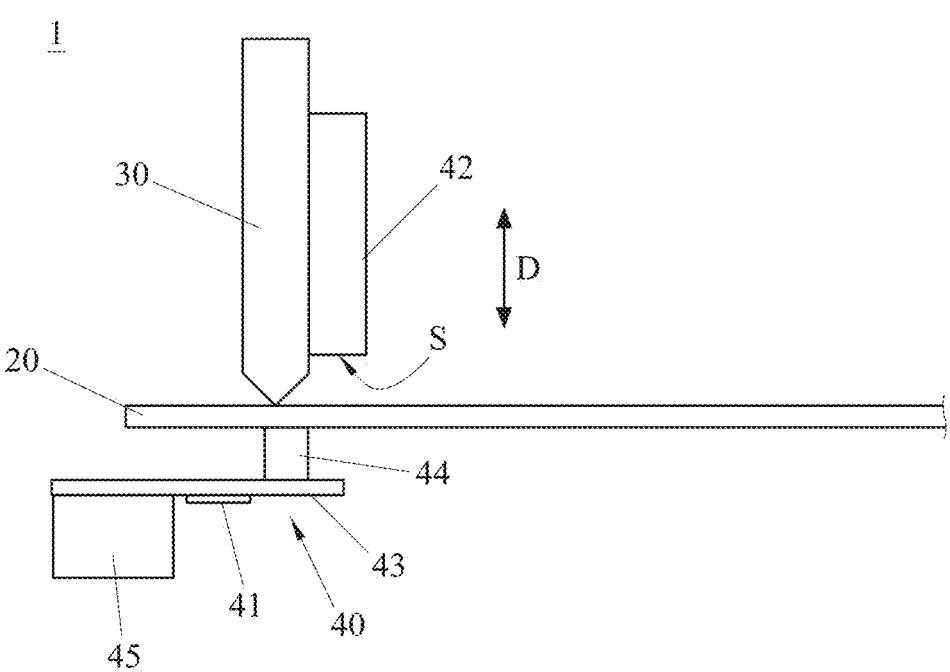
FIG. 2 is a schematic view of a part of the 3D printer in FIG. 1.

Referring to FIGS. 1 and 2, FIG. 1 is a perspective view of a 3D printer according to one first embodiment of the disclosure, and FIG. 2 is a schematic view of a part of the 3D printer in FIG. 1.

In this embodiment, the 3D printer 1 includes a frame 10, a carrier 20, a nozzle 30 and a detection device 40. The carrier 20 is fixed to the frame 10, and the nozzle 30 is movably disposed on the frame 10. The detection device 40 includes a piezoelectric ceramic sheet 41 and a position detector 42. The piezoelectric ceramic sheet 41 is in contact with the carrier 20. The position detector 42 is disposed on the nozzle 30 of the 3D printer 1.

Note that the position detector 42 of this embodiment is used for determining whether the nozzle 30 approaches the carrier 20, and the result thereof is the basis of the detection of the piezoelectric ceramic sheet 41 for improving the accuracy of the detection of the piezoelectric ceramic sheet 41. In other words, after the position detector 42 detects the nozzle 30 approaches the carrier 20, and then the piezoelectric ceramic sheet 41 receives vibrations, the vibration can be determined to be generated since the nozzle 30 goes down and contacts the carrier 20, thereby ensuring the nozzle 30 arrives a predetermined position. The position detector 42 is, for example, a proximity switch or a piezoelectric transceiver.

Moreover, the piezoelectric ceramic sheet 41 is used for detecting vibration instead of generating sound. When a piezoelectric ceramic material receives a mechanical vibration (or pressure), two electrodes may output voltage signal for achieving the vibration detection.

In this embodiment, the position detector 42 and the piezoelectric ceramic sheet 41 are electrically connected to a motherboard (not shown) of the 3D printer 1, and a detection surface of the position detector 42 corresponds to an upward/downward movement direction D of the nozzle 30, such that the position detector 42 can detect whether the nozzle 30 approaches the carrier 20 or not.

In this embodiment, the detection device 40 may further include a vibration transmission plate 43 for transmitting vibration and contacting the carrier 20, and the piezoelectric ceramic sheet 41 may be disposed on the vibration transmission plate 43. The vibration transmission plate 43 not only fixes the piezoelectric ceramic sheet 41 on the 3D printer 1, but also reduces the influences of the vibration as much as possible since the piezoelectric ceramic sheet 41 does not directly contact the 3D printer 1. The vibration transmission plate 43 may have a positioning recess, the positioning recess and the piezoelectric ceramic sheet 41 may have the same shape, such that the piezoelectric ceramic sheet 41 may be firmly disposed in the positioning recess. In some embodiments, the vibration transmission plate 43 may be metal plate, which is cheap and thus reduces the cost of the product.

In this embodiment, the detection device 40 further includes a first spring 44, and the vibration transmission plate 43 may be disposed below the carrier 20. One end of the first spring 44 may be connected to the vibration transmission plate 43, and another end of the first spring 44 may be in contact with the carrier 20. The first spring 44 is disposed between the carrier 20 and the vibration transmission plate 43, such that the first spring 44 can transmit vibrations and restore the deformed vibration transmission plate 43 to its original shape, thereby elongating the lifetime of the vibration transmission plate 43.

In this embodiment, the detection device 40 may include a fastening block 45. One end of the vibration transmission plate 43 is fixed to the fastening block 45, and another end of the vibration transmission plate 43 is in contact with the carrier 20 via the first spring 44. The fastening block 45 can support the vibration transmission plate 43, and the fastening block 45, the piezoelectric ceramic sheet 41, the vibration transmission plate 43 and the first spring 44 are modularized.

Figure 3:
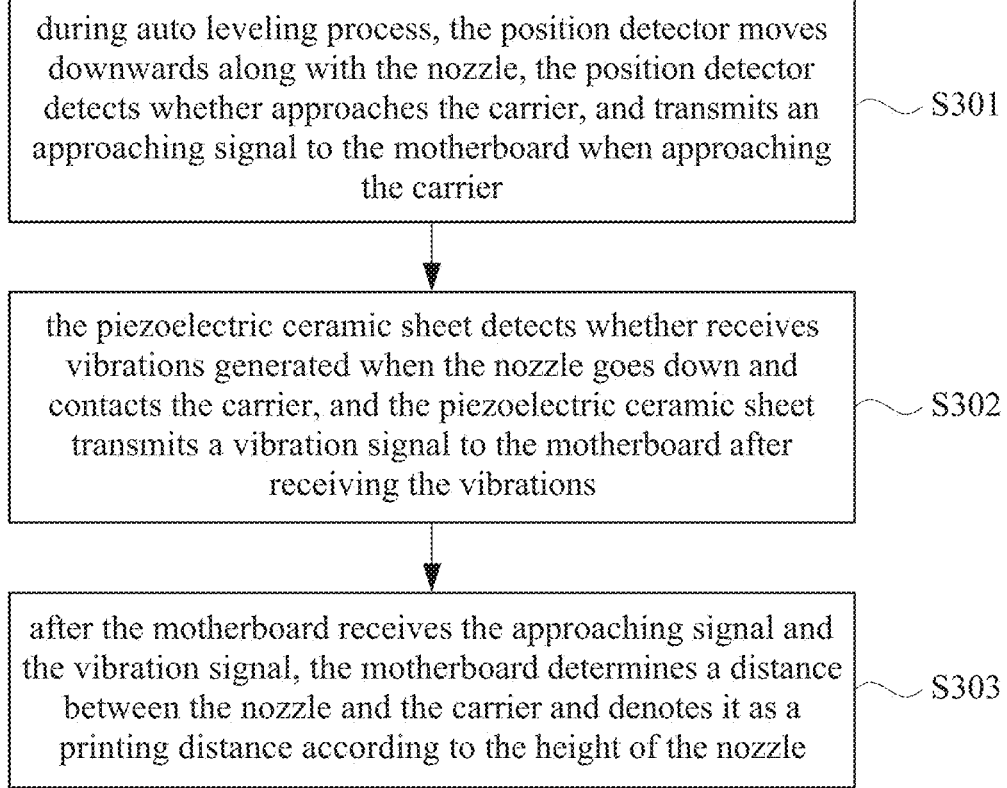
FIG. 3 is a flow chart of a printing control method cooperated with the 3D printer in FIG. 1.

Referring to FIGS. 2 and 3, FIG. 3 is a flow chart of a printing control method cooperated with the 3D printer in FIG. 1. This method specifically includes the following steps:

A step S301: during auto leveling process, the position detector 42 moves downwards along with the nozzle 30, the position detector 42 detects whether approaches the carrier 20, and transmits an approaching signal to the motherboard when approaching the carrier 20.

A step S302: the piezoelectric ceramic sheet 41 detects whether receives vibrations generated when the nozzle 30 goes down and contacts the carrier 20, and the piezoelectric ceramic sheet 41 transmits a vibration signal to the motherboard after receiving the vibrations.

A step S303: after the motherboard receives the approaching signal and the vibration signal, the motherboard determines a distance between the nozzle 30 and the carrier 20 and denotes it as a printing distance according to the height of the nozzle 30.

Note that the motherboard determines the vibration signal transmitted by the piezoelectric ceramic sheet 41 is produced when the nozzle 30 goes down and contacts the carrier 20, and the nozzle 30 reaches a predetermined position when receiving both of the approaching signal and the vibration signal only. If the motherboard merely receives the vibration signal, such vibration signal may be a false signal produced when the piezoelectric ceramic sheet 41 is influenced by external environment. On the other hand, if the motherboard merely receives the approaching signal, the piezoelectric ceramic sheet 41 may be abnormal, or the downward movement of the nozzle 30 may be abnormal, and thus the motherboard may produce an alert signal.

In this embodiment, the 3D printer 1 has the detection device 40, and the detection device 40 includes the piezoelectric ceramic sheet 41 and the position detector 42. When the nozzle 30 approaches the carrier 20, the position detector 42 produces the approaching signal, and then the piezoelectric ceramic sheet 41 produces the vibration signal when the nozzle 30 contacts the carrier 20, such that the piezoelectric ceramic sheet 41 is determined to detect the real vibrations, thereby solving the issue of the detection of the piezoelectric ceramic sheet 41 easily to be influenced by the external environment. As a result, the size of the piezoelectric ceramic sheet 41 is no longer limited, and may be increased according to the size of the 3D printer 1 or the size of a print object for meeting the accuracy requirement of the detection.

Figure 4:
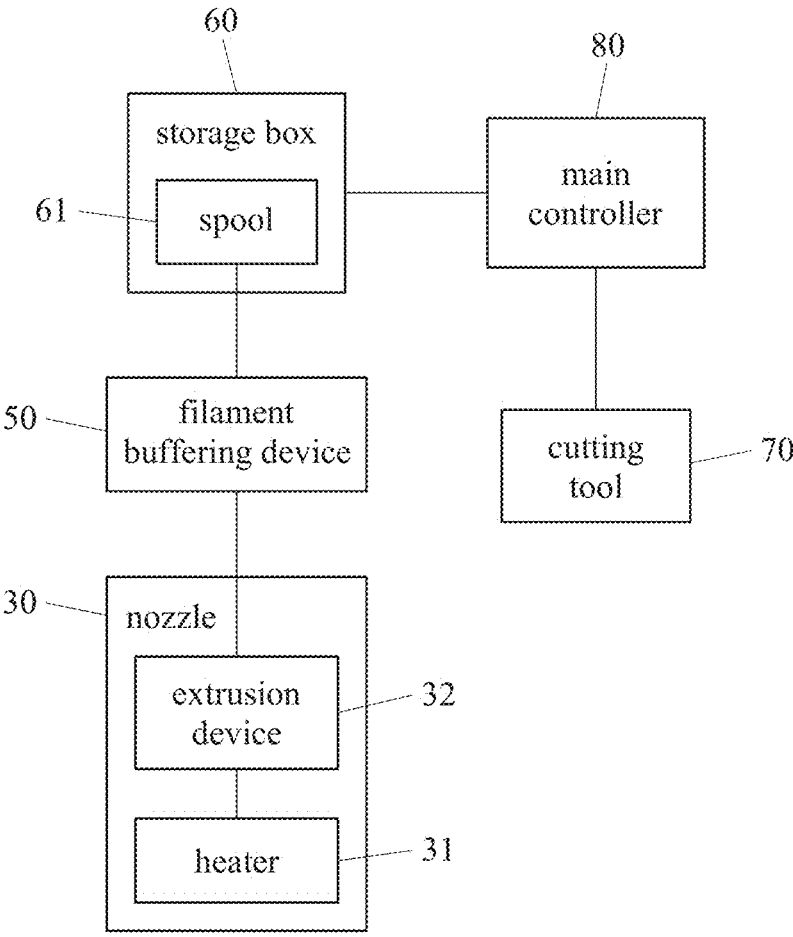
FIG. 4 is a block diagram of a storage box, a filament buffering device, a nozzle, a cutting tool and a main controller of the 3D printer in FIG. 1.

Referring to FIG. 4, FIG. 4 is a block diagram of a storage box, a filament buffering device, a nozzle, a cutting tool and a main controller of the 3D printer in FIG. 1. In this embodiment, the 3D printer 1 may further include a filament buffering device 50 and a storage box 60. The storage box 60 is configured to store a plurality of filaments, and can be driven by a predetermined command to automatically deliver a filament to be printed to the filament buffering device 50. The filament buffering device 50 is configured to receive and store the filament to be printed from the storage box 60 for providing buffering effect to the filament to prevent instability during the filament delivering process.

The storage box 60 has a plurality of spools 61 for winding and storing the filaments, and a filament driver (not shown) may be provided at an outlet of the storage box 60. The filament driver is configured to deliver the filament to be printed to the filament buffering device 50 and retrieve the filament from the filament buffering device 50 to the storage box 60. The filament buffering device 50 is disposed between the storage box 60 and the nozzle 30 for receiving and storing the filament to be printed and delivering the filament to be printed to the nozzle 30. The spools 61 of the storage box 60 deliver the filaments with a constant speed, and the nozzle 30 consumes the filament to perform printing with a speed varied depending on the printing object. The filament buffering device 50 prevents the accumulation of the filament when the nozzle 30 prints slower and prevents the filament from breaking when the nozzle 30 prints faster.

The storage box 60 has the spools 61, and the filaments may be respectively winded and stored on the spools 61. The spools 61 can be rotated so as to release the filament or rewind the filament on the spools 61. The filament driver is disposed at the outlet of the storage box 60. When receiving a printing command, the corresponding spool 61 releases the filament to be printed, such that the filament to be printed passes through the outlet and is delivered to the filament buffering device 50 by the filament driver. When this filament finishes in printing; that is, the filament is required to be replaced with another filament with different color, the filament driver retrieves the delivered filament into the storage box 60, and the spool 61 rewinds this filament thereon. At this moment, another spool 61 releases another filament with different color, and the filament driver delivers it to the filament buffering device 50. In a specific embodiment, there may be a plurality of outlet respectively corresponding to the spools 61, and there may be a filament driver disposed at each of the outlets for delivering the filament on the corresponding spool 61 to the filament buffering device 50.

The filament buffering device 50 is connected to the storage box 60 for receiving and storing the filament to be printed from the storage box 60. The filament buffering device 50 is further connected to the nozzle 30 for delivering the filament to the nozzle 30 to perform printing. When receiving the printing command, the filament buffering device 50 receives and stores the filament to be printed for providing the buffering effect to the filament to be printed. As a result, the accumulation of the filament caused when the filament delivering speed of the storage box 60 and the filament printing speed of the nozzle 30 does not match each other can be prevented, thereby improving the printing quality. In addition, the filament in the filament buffering device 50 can be continuously delivered to the nozzle 30, thereby preventing the issue of lacking of filament. When receiving the command of changing filament with different color, the filament in the filament buffering device 50 is retrieved to the storage box 60, and then the filament buffering device 50 receives and stores another filament with different color and delivers it to the nozzle 30. Therefore, there is no need to arrange multiple nozzles for perform printing with the filaments of different colors, such that the operation of the 3D printing can be simplified, thereby improving the printing efficiency.

Figure 5:
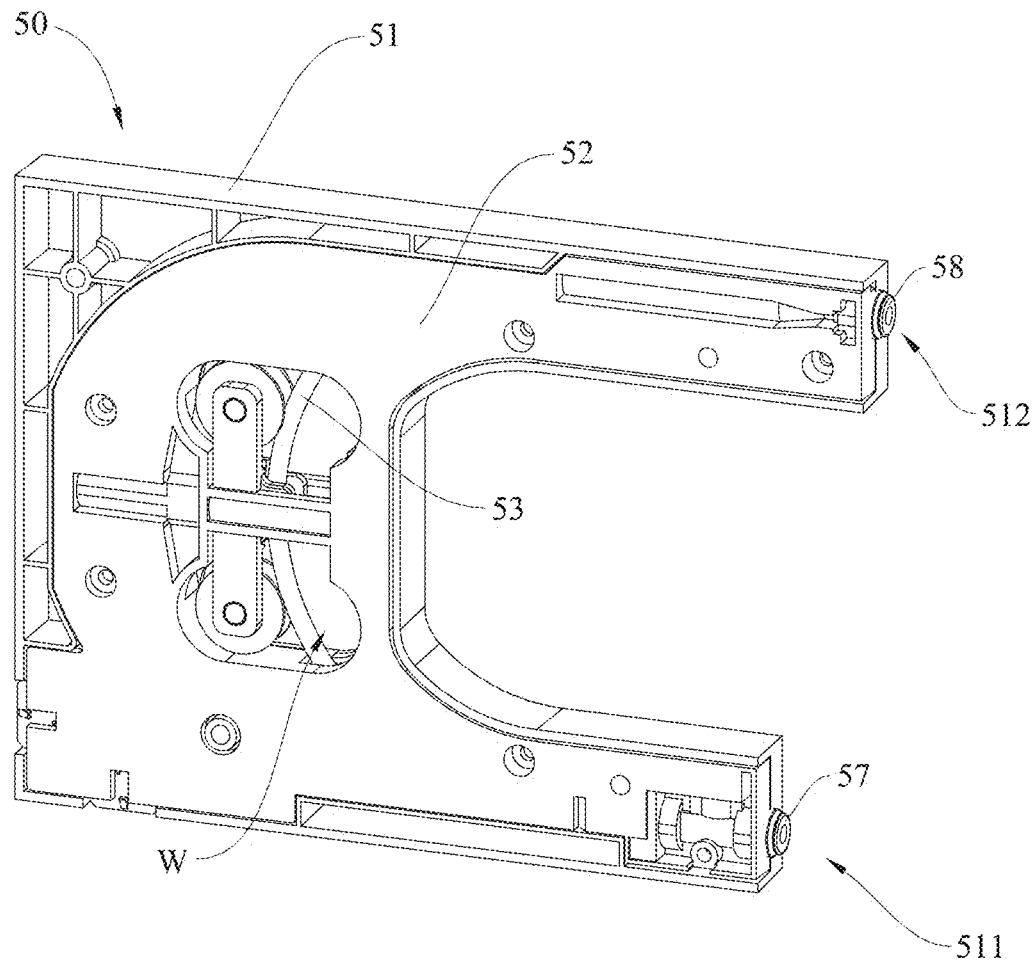
FIG. 5 is a perspective view of the filament buffering device in FIG. 4.
Figure 6:
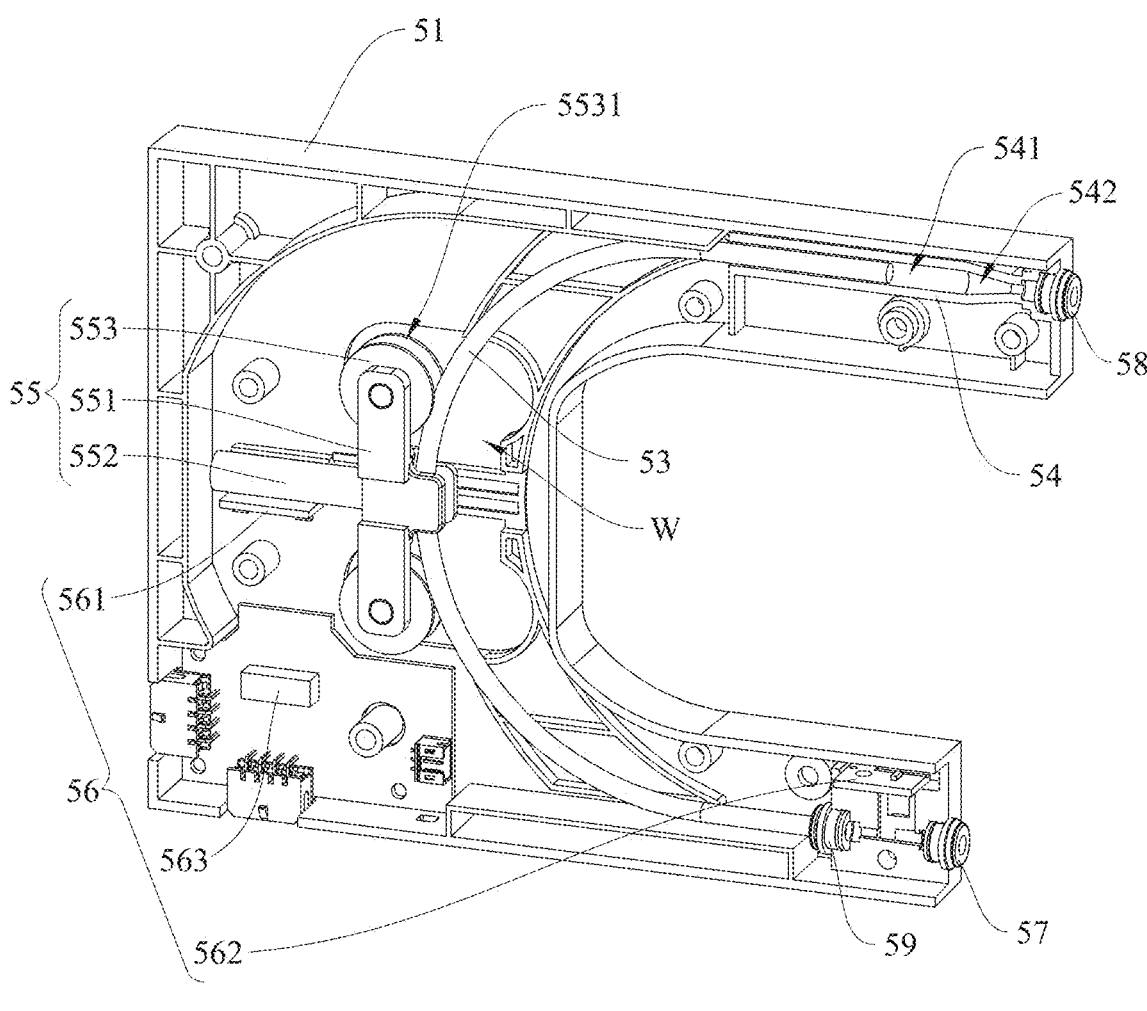
FIG. 6 is a partial perspective view of the filament buffering device in FIG. 5.

Referring to FIGS. 4 to 6, FIG. 5 is a perspective view of the filament buffering device in FIG. 4, and FIG. 6 is a partial perspective view of the filament buffering device in FIG. 5.

The filament buffering device 50 includes a casing 51, a side cover 52, a first guiding component 53, a second guiding component 54, a buffering assembly 55 and a detection assembly 56. The casing 51 has a material inlet end 511 and a material outlet end 512 for the filament to enter thereinto or leave therefrom. The material inlet end 511 and the material outlet end 512 are located at a same side of the casing 51 on a lengthwise direction of the casing 51. A first joint 57 is disposed at the material inlet end 511, and a second joint 58 is disposed at the material outlet end 512. The material inlet end 511 is connected to the storage box 60 via the first joint 57, and the material outlet end 512 is connected to the nozzle 30 via the second joint 58.

The first guiding component 53 and the second guiding component 54 are fixed to the casing 51. One end of the first guiding component 53 is fixed to the third joint 59, and the third joint 59 is engaged with the casing 51. The third joint 59 is aligned with the first joint 57, such that the filament can pass through the third joint 59 and enter into the first guiding component 53 after passing through the first joint 57. One end of the second guiding component 54 is disposed at the material outlet end 512 and communicates with the second joint 58. In this embodiment, the first guiding component 53 is a soft pipe, and the second guiding component 54 has a guide portion 541. One end of the first guiding component 53 located farther away from the third joint 59 extends into the guide portion 541 so as to be slidable in the guide portion 541. When the filament is provided too much, the first guiding component 53 can be moved to one side of the second guiding component 54 located farther away from the material outlet end 512, thereby providing the buffering effect to the filament.

The buffering assembly 55 is configured to drive the first guiding component 53 so as to facilitate the filament to move in the first guiding component 53. The buffering assembly 55 includes a slidable component 551, a second spring 552 and a plurality of contact wheels 553. The slidable component 551 is slidably disposed on the casing 51, such that the slidable component 551 can be located close to or far away from the material outlet end 512. The contact wheels 553 are rotatably disposed on one side of the slidable component 551 located closer to the material outlet end 512 via shafts. In this embodiment, there are two contact wheels 553, and the two contact wheels 553 are disposed on the slidable component 551 and are spaced apart from each other. Each contact wheel 553 has a positioning groove 5531 located at a side surface thereof for positioning the first guiding component 53, and the positioning groove 5531 is arranged along a circumferential direction of the contact wheel 553. The second spring 552 is located at one side of the slidable component 551 located farther away from the material outlet end 512. One end of the second spring 552 is fixed to the slidable component 551, and another end of the second spring 552 is fixed to the casing 51.

The detection assembly 56 is configured to detect a state of the filament in the filament buffering device 50. The detection assembly 56 includes a first detector 561, a second detector 562 and a controller 563. The first detector 561, the second detector 562 and the controller 563 are fixed to the casing 51, and the first detector 561 and the second detector 562 are electrically connected to the controller 563. The first detector 561 is disposed at one side of the slidable component 551 located farther away from the material outlet end 512 for detecting the position of the slidable component 551. The second detector 562 is located close to the material inlet end 511 of the casing 51 and is located between the first joint 57 and the third joint 59. The second detector 562 is configured to detect whether the filament enters into the first guiding component 53 or not.

After the second detector 562 detects the filament enters into the first guiding component 53, the first detector 561 starts to detect the position of the slidable component 551. When the first detector 561 detects that the slidable component 551 is moved away from the material outlet end 512, it represents that the length of the filament in the filament buffering device 50 reaches the maximum. At this moment, the first detector 561 transmits signal to the controller 563 to stop the operation of the filament driver (not shown), thereby reducing the risk of fracturing the filament caused when providing too much filament. When the first detector 561 detects the slidable component 551 is moved to be close to the material outlet end 512, it represents that the length of the filament in the filament buffering device 50 reaches the minimum. At this moment, the controller 563 controls the filament driver to speed up, thereby preventing the risk of breaking the filament caused when providing too less filament.

The side cover 52 is disposed at one side of the first guiding component 53 located farther away from the casing 51, and the side cover 52 is fixed to the casing 51 via bolts. Each of the side cover 52 and the casing 51 has an observation hole W for observing the position of the slidable component 551. The position of the slidable component 551 can be observed through the observation hole W, thereby rapidly determining the operation of the filament driver.

In this embodiment, the flexible first guiding component 53 and the second guiding component 54 enable the filament to be guided to the material outlet end 512 by the first guiding component 53 and the second guiding component 54 after the filament enters into the filament buffering device 50 from the material inlet end 511. The first guiding component 53 is slidable relative to the second guiding component 54, such that when the filament is provided too much, the first guiding component 53 may be deformed so as to slide relative to the second guiding component 54, and thus a part of the filament can be stored in the filament buffering device 50, thereby solving the possible issue of fracturing the filament during the 3D printing process.

The following descriptions will illustrate the operation of the filament buffering device 50 during the printing process. When the printing starts, the first guiding component 53 is filled with the filament from the storage box 60. The filament is continuously delivered while one end of the first guiding component 53 is driven to move away from the guide portion 541, such that the filament in the first guiding component 53 can be pushed and stored in the guide portion 541 for preventing the accumulation of the filament, thereby providing the buffering effect to the filament. When the guide portion 541 is full of the filament, the storage box 60 stops delivering the filament to the filament buffering device 50, and the buffering assembly 55 drives one end of the first guiding component 53 to move towards the guide portion 541 so as to push the stored filament to the nozzle 30. After the filament in the guide portion 541 is finished to be delivered, the storage box 60 delivers the filament into the first guiding component 53 again while one end of the first guiding component 53 is driven to move away from the guide portion 541 for filling the filament into the guide portion 541. As a result, the back and forth movement of the first guiding component 53 in the guide portion 541 can achieve a dynamic balance between the storage and delivering of the filament.

During the practical printing process, the filament delivering of the storage box 60 and the filament printing of the nozzle 30 are performed simultaneously, and the printing speed of the nozzle 30 may be varied according to the printing object. When the filament delivering speed of the storage box 60 is greater than the filament printing speed of the nozzle 30, the cooperation of the guide portion 541 and the first guiding component 53 can provide the buffering effect for the delivering of the filament, thereby preventing the filament from accumulating in the nozzle 30 and blocking the nozzle 30. If the filament printing speed of the nozzle 30 is increased, the filament stored in the first guiding component 53 and the guide portion 541 can provide to the nozzle 30 to perform printing. The guide portion 541 is, for example, a recess to cooperate with the first guiding component 53 for enabling one end of the first guiding component 53 to be movable along the guide portion 541. In another embodiment, the guide portion 541 may be a round channel, and the length of the guide portion 541 may be modified according to actual requirements.

A detector may be provided on the buffering assembly 55 for detecting the position of the first guiding component 53. When the first guiding component 53 is moved to a first predetermined position, one end of the first guiding component 53 is moved to a position in the guide portion 541 located farthest away from the second joint 58; that is, the amount of the filament stored in the guide portion 541 reaches the maximum, and the storage box 60 stops delivering the filament to be printed to the filament buffering device 50. Since the nozzle 30 continuously prints the filament, the buffering assembly 55 drives one end of the first guiding component 53 to move towards the guide portion 541; that is, the first guiding component 53 is moved from the first predetermined position to a second predetermined position, thereby providing the filament to the nozzle 30 to perform printing. When the first guiding component 53 is moved to the second predetermined position, one end of the first guiding component 53 is moved to a position in the guide portion 541 located closest to the second joint 58; that is, the filament in the guide portion 541 is depleted. The storage box 60 starts to deliver the filament to be printed to the first guiding component 53 of the filament buffering device 50 again, and the first guiding component 53 pushes the filament into the guide portion 541 while moving from the second predetermined position to the first predetermined position. Note that the first guiding component 53 can be moved back and forth between the first predetermined position and the second predetermined position so as to adjust the position of one end of the first guiding component 53 in the guide portion 541, thereby adjusting the buffering length to the filament, and thus achieving the stable delivering of the filament.

In a specific embodiment, the first guiding component 53 may be a straight pipe or a U-shaped pipe, preferably the U-shaped pipe. One end of the U-shaped pipe has a filament inlet which is located at one end of the U-shaped pipe and communicates with the outlet of the storage box 60. Another end of the U-shaped pipe is movably connected to the guide portion 541, and one end of the guide portion 541 located farther away from the U-shaped pipe is provided with a filament outlet which communicates with the nozzle 30.

The second guiding component 54 has a protective portion 542, and the protective portion 542 is located at one end of the guide portion 541 farther away from the first guiding component 53. The guide portion 541 is connected to the nozzle 30 via the protective portion 542, and the filament is delivered to the nozzle 30 through the protective portion 542. When the first guiding component 53 is moved to the second predetermined position, the filament in the guide portion 541 is depleted. At this moment, the storage box 60 replenishes the filament into the first guiding component 53 and the guide portion 541. In order to prevent the filament from breaking, the filament remained in the protective portion 542 is delivered to the nozzle 30 to perform printing. After the guide portion 541 receives the filament, the aforementioned processes are performed again, thereby ensuring the consistency of the printing and improving the 3D printing quality.

As shown in FIG. 4, the nozzle 30 includes a heater 31 and an extrusion device 32. The extrusion device 32 is connected to the filament buffering device 50 for delivering the filament to the heater 31. Specifically, the spools 61 of the storage box 60 stores the filaments with different colors, and the filaments can be delivered to the nozzle 30 through the filament buffering device 50. The nozzle 30 has the extrusion device 32 for receiving the filaments and delivering the filaments to the heater 31 to perform printing. In some embodiments, the extrusion device 32 may have a filament detector (not shown) for detecting the filament. The filament detector can detect whether the filament is the correct filament to be printed for preventing the extrusion device 32 from receiving the wrong filament, thereby ensuring the printing quality.

The 3D printer 1 may further include a cutting tool 70 and a main controller 80. The cutting tool 70 is disposed between the nozzle 30 and the filament buffering device 50 for cutting the filament. The main controller 80 is electrically connected to the cutting tool 70 and the storage box 60. The main controller 80 is configured to drive the cutting tool 70 to cut the filament according to a color change command, and is configured to drive the storage box 60 to deliver or retrieve the filament according to the printing command or the color change command. Specifically, when receiving the printing command, the main controller 80 drives the storage box 60 to deliver the filament to be printed on the corresponding spool 61 to the filament buffering device 50. When receiving the color change command; that is, the filament is finished to be printed, the main controller 80 drives the cutting tool 70 to cut the filament and drives the spool 61 of the storage box 60 to retrieve the cut filament from the filament buffering device 50 and wind it thereon, thereby improving the utilization of the filament and reducing the cost of 3D printing process.

The filament delivering speed of the storage box 60 may be greater than the filament delivering speed of the extrusion device 32. Preferably, the filament delivering speed of the spool 61 of the storage box 60 may be three times of the filament delivering speed of the extrusion device 32, such that the storage box 60 can provide a sufficient amount of the filament to the extrusion device 32 and the heater 31 immediately, thereby ensuring the smooth operation of the 3D printer 1.

The printing process of the 3D printer 1 of this embodiment is specifically introduced as follow. When receiving the printing command, the spool 61 of the storage box 60 delivers the filament to be printed to the filament buffering device 50 through the outlet of the storage box 60. The filament buffering device 50 receives and stores the filament to be printed and delivers it to the extrusion device 32 of the nozzle 30. The extrusion device 32 detects the filament to be printed and moves it to the heater 31 of the nozzle 30 to perform printing according to a predetermined model. When receiving the color change command, the main controller 80 drives the cutting tool 70 to cut the filament. At this moment, the spool 61 retrieves the filament which is finished to be printed while the storage box 60 delivers another filament with different color to the filament buffering device 50, such that the nozzle 30 can perform printing with such filament.

Figure 7:
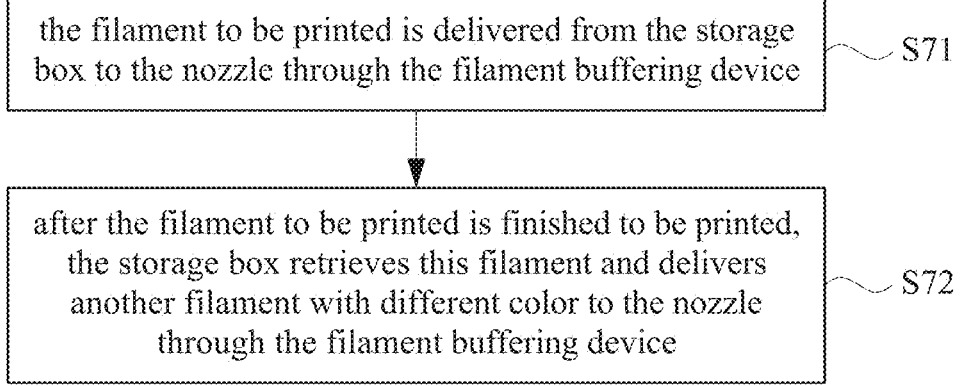
FIG. 7 is a flow chart of a multi-color printing method cooperated with the 3D printer in FIG. 1.
Figure 8:
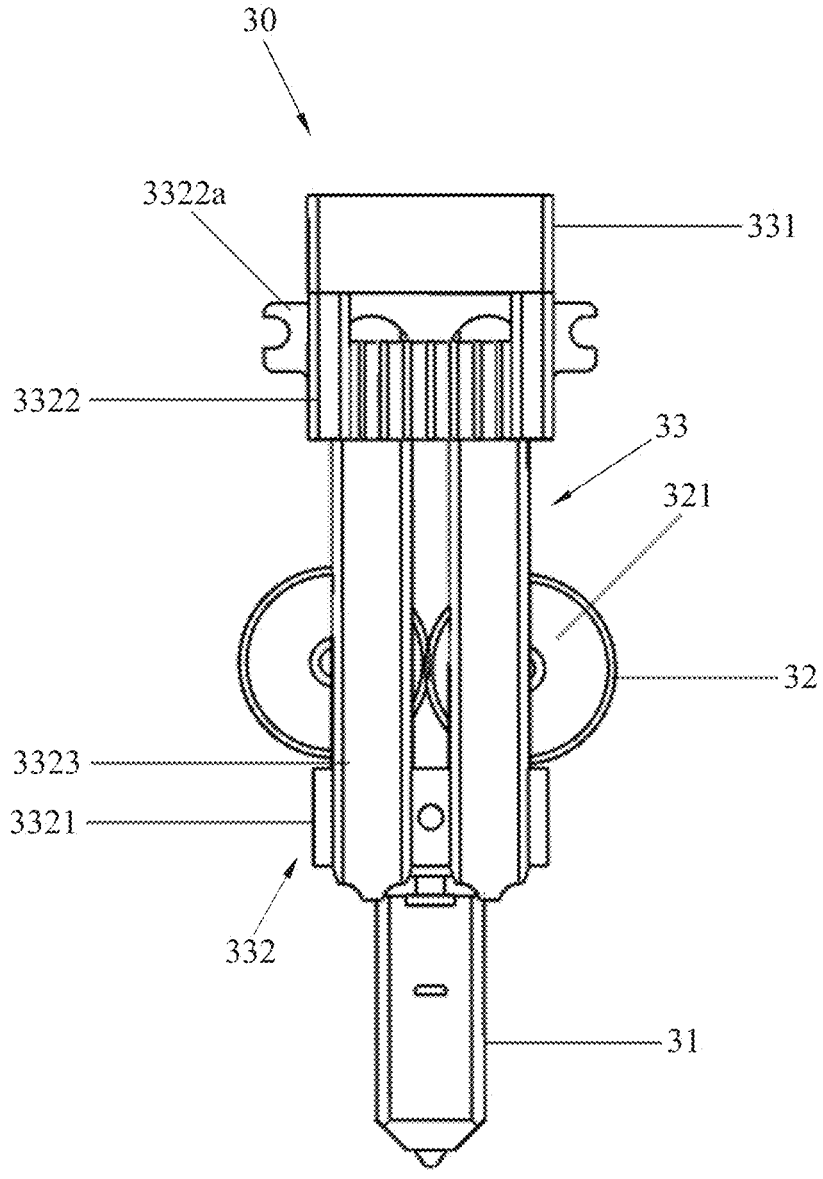
FIGS. 8 to 12 are perspective or schematic views of the nozzle of the 3D printer in FIG. 1.
Figure 9:
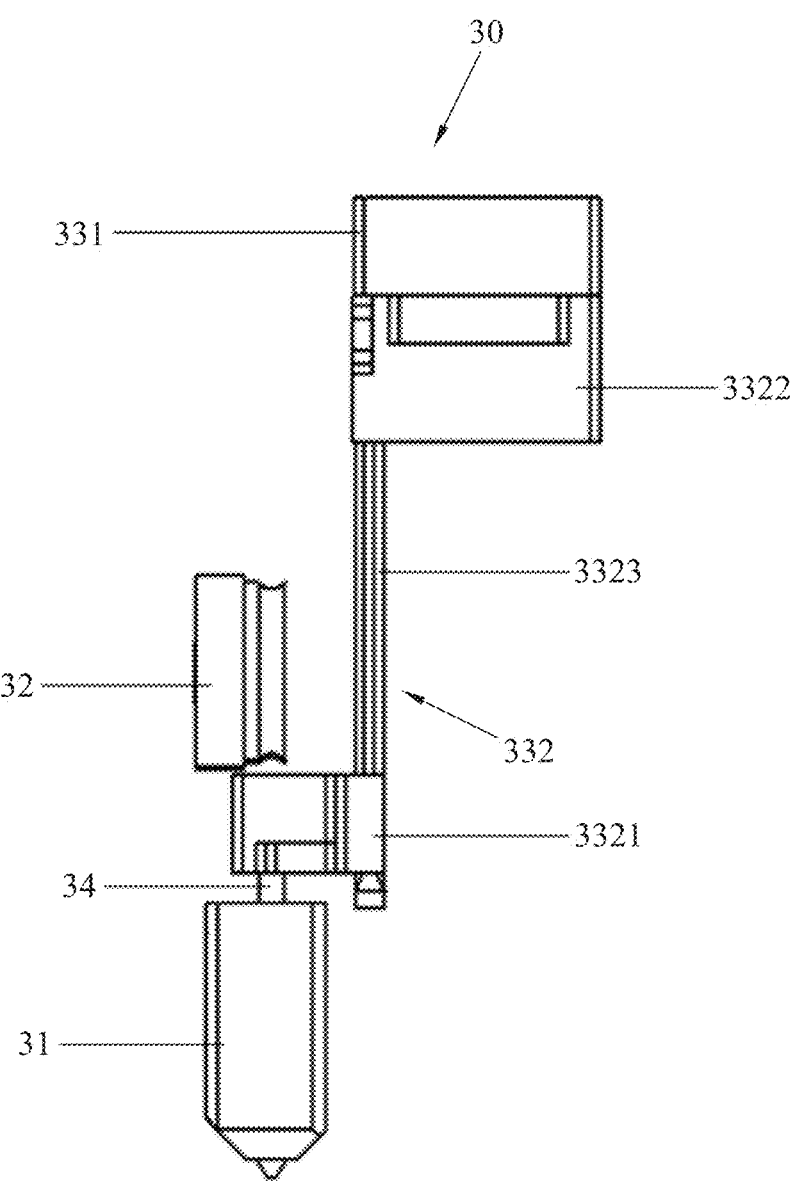

The following paragraphs will introduce a multi-color printing method cooperated with the 3D printer 1 of this embodiment. Referring to FIG. 7, FIG. 7 is a flow chart of a multi-color printing method cooperated with the 3D printer in FIG. 1. The multi-color printing method includes:

A step S71: the filament to be printed is delivered from the storage box 60 to the nozzle 30 through the filament buffering device 50; and A step 72: after the filament to be printed is finished to be printed, the storage box 60 retrieves this filament and delivers another filament with different color to the nozzle 30 through the filament buffering device 50.

Furthermore, the step S71 may include: the filament buffering device 50 receives the filament to be printed from the storage box 60. Specifically, the first guiding component 53 of the filament buffering device 50 receives the filament to be printed from the storage box 60, such that the filament to be printed is located in the first guiding component 53. Then, whether the amount of the filament to be printed in the filament buffering device 50 reaches the predetermined maximum value is determined. If no, the filament buffering device 50 keep receiving the filament to be printed from the storage box 60. If yes, the filament buffering device 50 stops receiving the filament to be printed from the storage box 60.

Note that the predetermined maximum amount of the filament to be printed in the filament buffering device 50 is the amount of the filament which fully fills the first guiding component 53 and the guide portion 541 of the filament buffering device 50.

In some embodiments, after the step S71, a step may be performed to determine whether the nozzle 30 receives the filament to be printed. If yes, the nozzle 30 performs printing according to the predetermined model. If no, the nozzle 30 keep trying to receive the filament to be printed in a predetermined period of time. When the nozzle 30 still does not receive the filament to be printed after exceeding the predetermined period of time, the 3D printer is required to be maintained. After the maintenance of the 3D printer 1, the step S71 is performed again to deliver the filament to be printed from the storage box 60 to the nozzle 30 through the filament buffering device 50.

More specifically, after the filament to be printed is delivered to the nozzle 30 through the filament buffering device 50, the extrusion device 32 of the nozzle 30 receives the filament while the filament detector on the extrusion device 32 detects whether the extrusion device 32 accurately receives the filament and whether the received filament is the filament to be printed or not. If yes, the nozzle 30 performs printing according to the predetermined model. In contrast, if the extrusion device 32 does not receive the filament or the received filament is not the filament to be printed in the predetermined period of time, the 3D printer 1 is determined to be in malfunction. After the 3D printer 1 is maintained to address the malfunction, the filament to be printed is delivered to be nozzle 30 through the extrusion device 32 again, thereby ensuring the accuracy and high quality of multi-color 3D printing.

Then, referring to FIGS. 8 to 12, FIGS. 8 to 12 are perspective or schematic views of the nozzle of the 3D printer in FIG. 1.

The nozzle 30 of the 3D printer 1 of this embodiment not only includes the extrusion device 32 and the heater 31, but also includes a heat dissipation device 33. The heat dissipation device 33 includes a fan 331 disposed above the heater 31 and a thermally conductive assembly 332 disposed between the fan 331 and the heater 31.

The thermally conductive assembly 332 includes a first metal component 3321 connected to the heater 31 and a second metal component 3322 connected to the fan 331, and a plurality of heat pipes 3323 are located between and connected to the first metal component 3321 and the second metal component 3322. The extrusion device 32 is disposed on the first metal component 3321 for extruding or retrieving the filament. The thermally conductive assembly 332 is configured to conduct heat generated by the heater 31 to the fan 331. Specifically, the heat generated by the heater 31 is conducted to the first metal component 3321, the heat pipes 3323 conducts the heat to the second metal component 3322, and then the fan 331 generates an airflow to take heat on the second metal component 3322 away, such that the nozzle 30 can be cooled. The extrusion device 32 is disposed on the first metal component 3321, thereby reducing a distance from the filament to the heater 31. As a result, the heat dissipation efficiency is ensured while the accuracy of extruding and retrieving the filament is improved.

Compared to a conventional technique, the thermally conductive assembly 332 conducts the heat generated by the heater 31 to the fan 331 based on thermal conduction, thereby improving the heat dissipation efficiency to the nozzle 30. The position of the extrusion device 32 reduces the distance between the extruded filament and the heater 31, thereby ensuring the printing accuracy and the printing quality.

The quantity of the heat pipes 3323 is preferably two for saving the cost while maintaining the heat dissipation efficiency. Each of the heat pipes 3323 is connected to the first metal component 3321 and the second metal component 3322. Note that the quantity of the heat pipes 3323 may be modified according to actual requirements.

The heater 31 is connected to a tube 34, and the tube 34 connects the heater 31 with the first metal component 3321. One end of the tube 34 located farther away from the heater 31 is disposed through the first metal component 3321, such that the tube 34 can receive the filament extruded from the extrusion device 32, and the heat generated by the heater 31 can be effectively conducted to the heater 31 for being rapidly dissipated.

Figure 10:
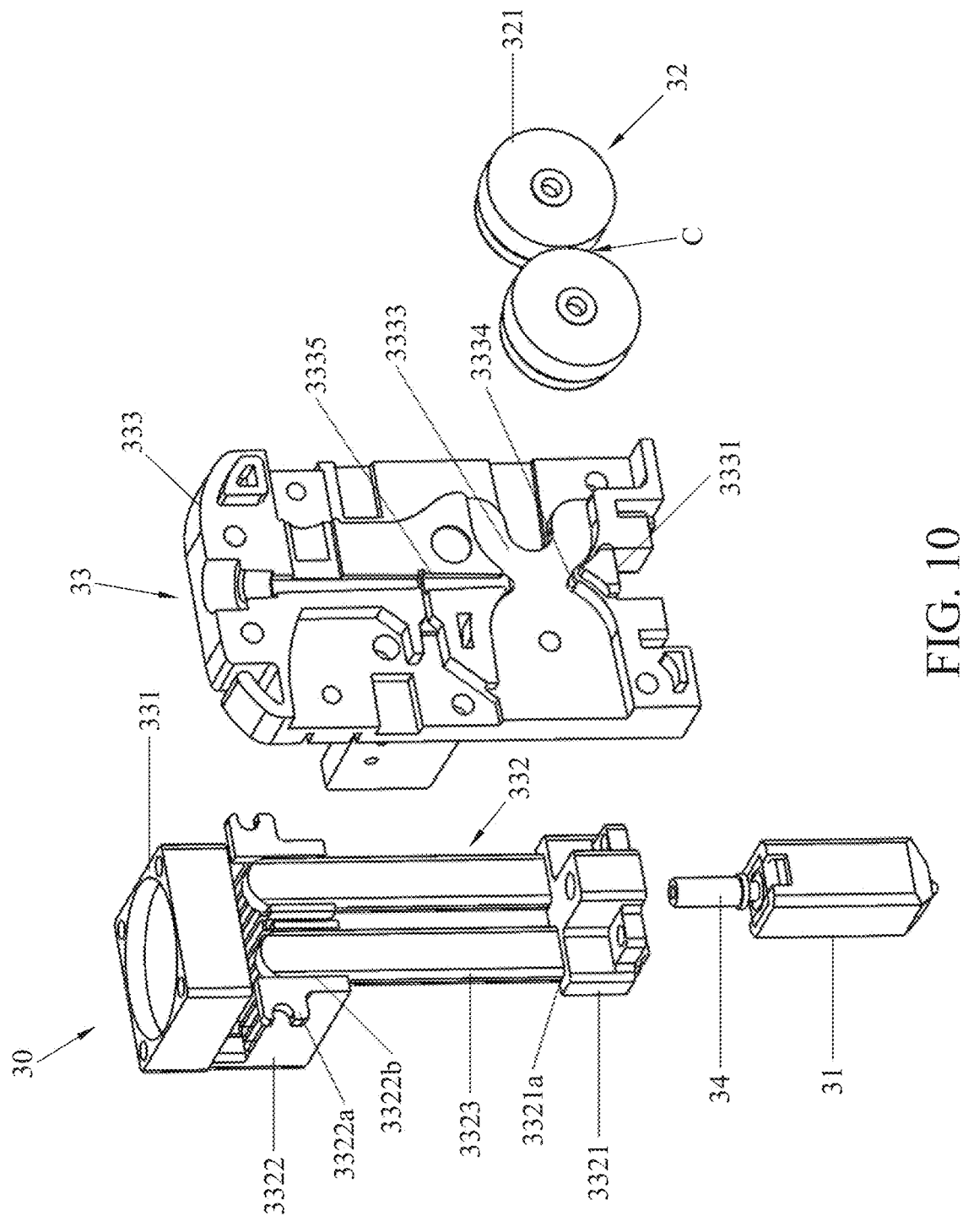
Figure 11:
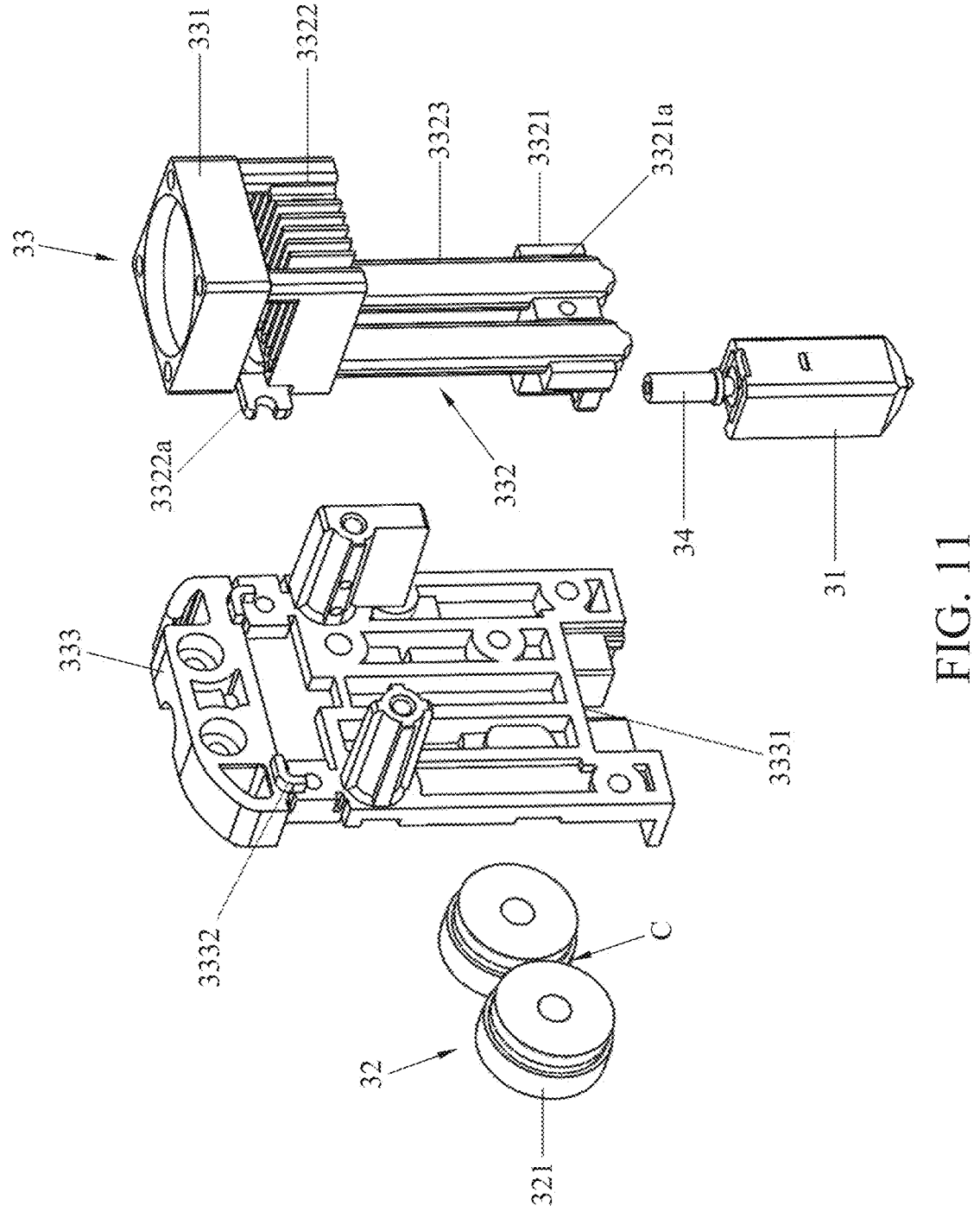
Figure 12:
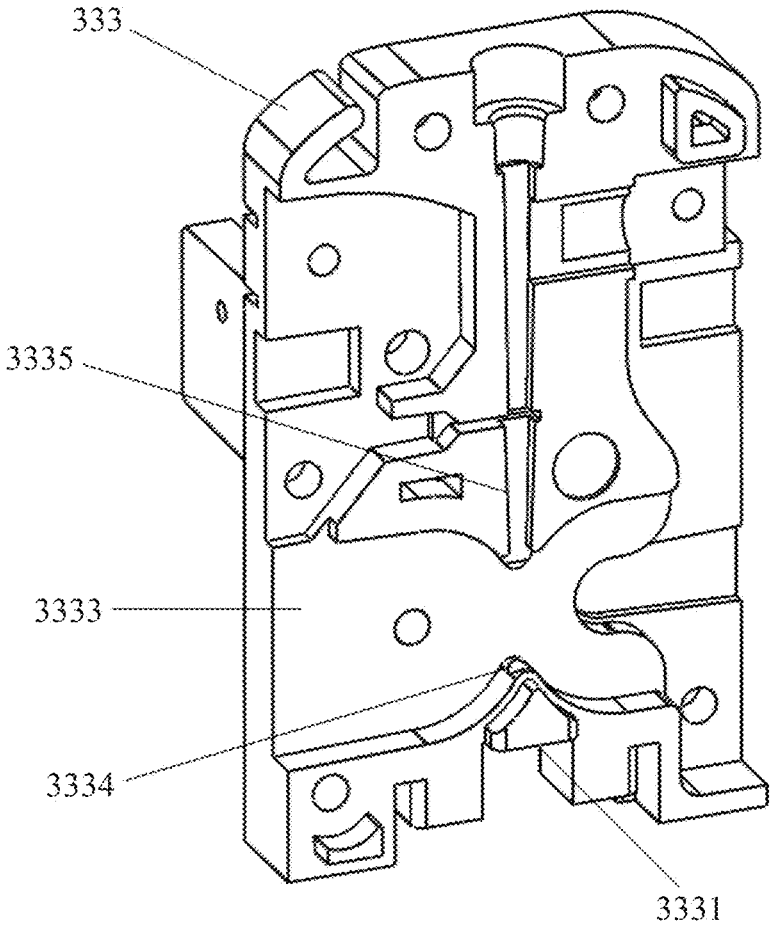

As shown in FIGS. 10 to 12, the heat dissipation device 33 further includes an installation plate 333, the installation plate 333 has an installation recess 3331 located at a bottom of the installation plate 333, and the first metal component 3321 is engaged into the installation recess 3331. Two engagement structures 3322a are respectively provided at two opposite sides of the second metal component 3322. Two fastening structures 3332 are provided at one side of the installation plate 333 towards the thermally conductive assembly 332, and the engagement structures 3322a are respectively engaged with the fastening structures 3332. Specifically, the first metal component 3321 is fixed to the installation recess 3331. For example, the first metal component 3321 may be engaged into the installation recess 3331, and may be fixed to the installation plate 333 via fasteners, such as bolts. The second metal component 3322 are engaged with the fastening structures 3332 of the installation plate 333 located at one side thereof via the engagement structures 3322a. In another embodiment, the fastening structures 3332 may each have a first thread hole, and the engagement structures 3322a may each have a second thread hole corresponding to the first thread hole. Screws are fastened into the first thread holes and the second thread holes, such that the second metal component 3322 can be fixed to one side of the installation plate 333 for strengthening the fixation between them.

As shown in FIG. 10, the specific connection manner among the first metal component 3321, the second metal component 3322 and the heat pipes 3323 are given in the follow. The first metal component 3321 has a plurality of first engagement holes 3321a located at one side of the first metal component 3321 located farther away from the installation plate 333. First ends of the heat pipes 3323 are respectively engaged into the first engagement holes 3321a. The second metal component 3322 has a plurality of second engagement holes 3322b located at one side of the second metal component 3322 towards the installation plate 333. Second ends of the heat pipes 3323 are respectively engaged into the second engagement holes 3322b. Note that the heat pipes 3323 are thermally conductive copper pipes, which have a characteristic of active heat dissipation. Fluid in the thermally conductive copper pipes can be condensed to transfer heat generated by the heater 31 actively, thereby achieving high efficiency of heat exchange.

The extrusion device 32 includes two extrusion wheels 321. The installation plate 333 has two accommodation recesses 3333 located at one side of the installation plate 333 located farther away from the thermally conductive assembly 332 for accommodating the extrusion wheels 321. The accommodation recesses 3333 are shaped to match the extrusion wheels 321. The extrusion wheels 321 are rotatably mounted in the accommodation recesses 3333, respectively. The two extrusion wheels 321 includes a first extrusion wheel and a second extrusion wheel. The accommodation recesses 3333 includes a first accommodation recess for the first extrusion wheel to be rotatably connected thereto and a second accommodation recess for the second extrusion wheel to be rotatably connected thereto. When the first extrusion wheel rotates clockwise, the second extrusion wheel rotates counterclockwise. When the first extrusion wheel rotates counterclockwise, the second extrusion wheel rotates clockwise. Preferably, each of the extrusion wheels 321 has a shaft hole located at the center thereof. Each of the accommodation recesses 3333 is provided with a shaft corresponding to the shaft hole, and the shaft is rotatably mounted in the shaft hole.

A transmission passage C is formed between the two extrusion wheels 321 for extruding or retrieving the filament. A through hole 3334 is provided at a bottom of the installation recess 3331. A first end of the through hole 3334 communicates with the tube 34, and a second end of the through hole 3334 communicates with the transmission passage C. The extrusion wheels 321 rotates clockwise and counterclockwise, respectively, such that the filament in the transmission passage C can be pushed to the second end of the through hole 3334 and then delivered to the tube 34 through the first end of the through hole 3334, or the filament in through hole 3334 can be retrieved for replacing it with another filament to proceed 3D printing.

The installation plate 333 further has a material channel 3335 located at one side of the installation plate 333 located farther away from the thermally conductive assembly 332 for delivering the filament. The material channel 3335 communicates with one end of the transmission passage C located farther away from the first metal component 3321. The material channel 3335 is configured to accommodate the filament and deliver the filament to the transmission passage C between the extrusion wheels 321.

The fan 331 is fixed to the second metal component 3322 via mechanical fasteners, and an air outlet of the fan 331 is aligned with the second metal component 3322. The mechanical fasteners are, for example, bolts for fixing four corners of the fan 331 to the second metal component 3322. The second metal component 3322 may have a plurality of air channels aligned with the air outlet of the fan 331, such that the airflow generated by the fan 331 can take heat of the second metal component 3322 away.

According to the 3D printer as disclosed in the above embodiment, the 3D printer has the detection device, and the detection device includes the piezoelectric ceramic sheet and the position detector. When the nozzle approaches the carrier, the position detector produces the approaching signal, and then the piezoelectric ceramic sheet produces the vibration signal when the nozzle contacts the carrier, such that the piezoelectric ceramic sheet is determined to detect the real vibrations by these two signal, thereby solving the issue of the detection of the piezoelectric ceramic sheet easily be influenced by the external environment. As a result, the size of the piezoelectric ceramic sheet is no longer limited, and may be increased according to the size of the 3D printer or the size of a print object for meeting the accuracy requirement of the detection.

In addition, the flexible first guiding component and the second guiding component enable the filament to be guided to the material outlet end by the first guiding component and the second guiding component after the filament enters into the filament buffering device from the material inlet end. The first guiding component is slidable relative to the second guiding component, such that when the filament is provided too much, the first guiding component may be deformed so as to slide relative to the second guiding component, and thus a part of the filament can be stored in the filament buffering device, thereby solving the possible issue of fracturing the filament during the 3D printing process.

Moreover, the spools of the storage box winds and stores the filament, and the filament driver can deliver the filament, thereby achieving automatic filament replenishment. The filament buffering device is provided in the 3D printer for providing the buffering effect to the filament, thereby preventing issues of unsmooth operation (e.g., the accumulation of the filament) during the delivering of the filament. Therefore, there is no need to arrange multiple filament passages for perform printing with the filaments of different colors, such that the operation of the multi-color printing can be simplified, thereby improving the printing efficiency.

Furthermore, the thermally conductive assembly can conduct heat generated by the heater to fan based on thermal conduction, thereby improving the heat dissipation efficiency to the nozzle. On the other hand, the position of the extrusion device reduces the distance between the extruded filament and the heater, thereby ensuring the printing accuracy and the printing quality.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A 3D printer, comprising:
a frame;
a carrier, fixed to the frame;
a nozzle, movably disposed on the frame; and
a detection device, comprising:
 a piezoelectric ceramic sheet, in contact with the carrier; and
 a position detector, disposed on the nozzle;
wherein the 3D printer further comprises a filament buffering device and a storage box, wherein the filament buffering device comprises:
 a casing, wherein the casing has a material inlet end and a material outlet end, the material inlet end and the material outlet end are located at a same side of the casing, the material inlet end is connected to the storage box, and the material outlet end is connected to the nozzle;
 a first guiding component, wherein one end of the first guiding component is fixed to the material inlet end; and
 a second guiding component, wherein one end of the second guiding component is fixed to the material outlet end, and another end of the first guiding component located farther away from the material inlet end and another end of the second guiding component located farther away from the material outlet end are slidably cooperated with each other;
wherein the filament buffering device further comprises a buffering assembly, and the buffering assembly comprises:
 a slidable component, wherein the slidable component is located at one side of the first guiding component, and the slidable component is slidably connected to the casing;

a contact wheel, wherein the contact wheel is rotatably connected to the slidable component, and the contact wheel is in contact with the first guiding component; and
 a second spring, wherein the second spring is disposed at one side of the slidable component located farther away from the first guiding component, and the second spring is connected to the slidable component and the casing.

2. The 3D printer according to claim 1, wherein a detection surface of the position detector corresponds to an upward/downward movement direction of the nozzle.

3. The 3D printer according to claim 1, wherein the detection device further comprises a vibration transmission plate, the piezoelectric ceramic sheet is disposed on the vibration transmission plate, and the vibration transmission plate is in contact with the carrier.

4. The 3D printer according to claim 3, wherein the detection device further comprises a first spring and a fastening block, the vibration transmission plate is disposed below the carrier, one end of the first spring is connected to the vibration transmission plate, another end of the first spring is in contact with the carrier, one end of the vibration transmission plate is fixed on the fastening block, and another end of the vibration transmission plate is in contact with the carrier via the first spring.

5. The 3D printer according to claim 1, wherein the filament buffering device further comprises a detection assembly, the detection assembly comprises a first detector and a controller, the first detector and the controller are fixed to the casing, the first detector is electrically connected to the controller, the first detector is disposed at one side of the slidable component located farther away from the first guiding component, and the first detector is configured to detect a position of the slidable component.

6. The 3D printer according to claim 5, wherein the detection assembly further comprises a second detector, the second detector is disposed at the material inlet end, the second detector is electrically connected to the controller, and the second detector is configured to detect whether a filament enters into the first guiding component or not.

7. The 3D printer according to claim 1, wherein the contact wheel has a positioning groove located at a side surface of the contact wheel and arranged along a circumferential direction of the contact wheel, and the positioning groove is configured to position the first guiding component.

8. The 3D printer according to claim 1, wherein the casing has an observation hole for observing a position of the slidable component.

9. The 3D printer according to claim 1, wherein the filament buffering device further comprises a side cover, the side cover is disposed at one side of the first guiding component located farther away from the casing, and the side cover is fixed to the casing.

10. The 3D printer according to claim 1, wherein the filament buffering device further comprises a first joint, a second joint and a third joint which are fixed to the casing, the first joint is located at the material inlet end, the second joint is located at the material outlet end, the third joint is fixed to one end of the first guiding component located closer to the material inlet end.

11. The 3D printer according to claim 1, wherein the nozzle comprises a heater and a heat dissipation device, and the heat dissipation device comprises:
 a fan, located above the heater; and
 a thermally conductive assembly, disposed between the fan and the heater;

wherein the thermally conductive assembly comprises a first metal component connected to the heater and a second metal component connected to the fan, a plurality of heat pipes are provided between and connected to the first metal component and the second metal component, and an extrusion device is disposed on first metal component for extruding or retrieving a filament.

12. The 3D printer according to claim 11, wherein the heater is connected to a tube, and one end of the tube located farther away from the heater is disposed through the first metal component for receiving the filament extruded by the extrusion device.

13. The 3D printer according to claim 12, wherein the heat dissipation device further comprises an installation plate, the installation plate has an installation recess, and the first metal component is engaged into the installation recess;

two engagement structures are respectively provided at two opposite sides of the second metal component, and two fastening structures are provided at one side of the installation plate towards the thermally conductive assembly to be engaged with the two engagement structures.

14. The 3D printer according to claim 13, wherein the first metal component has a plurality of first engagement holes located at one side of the first metal component located farther away from the installation plate, and the second metal component has a plurality of second engagement holes located at one side of the second metal component towards the installation plate;

first ends of the plurality of heat pipes are respectively engaged in the plurality of first engagement holes, and second ends of the plurality of heat pipes are respectively engaged in the plurality of second engagement holes.

15. The 3D printer according to claim 13, wherein the extrusion device comprises two extrusion wheels, the installation plate has two accommodation recesses located at one side of the installation plate located farther away from the thermally conductive assembly, and the extrusion wheels are rotatably disposed in the accommodation recesses, respectively.

16. The 3D printer according to claim 15, wherein a transmission passage is provided between the extrusion wheels for extruding or retrieving the filament;

a through hole is provided at a bottom of the installation recess, a first end of the through hole communicates with the tube, and a second end of the through hole communicates with the transmission passage.

17. The 3D printer according to claim 16, wherein the installation plate has a material channel located at one side of the installation plate located farther away from the thermally conductive assembly for delivering the filament, and the material channel communicates with one end of the transmission passage located farther away from the first metal component.

18. The 3D printer according to claim 11, wherein the fan is fixed to the second metal component via bolts, and an air outlet of the fan is aligned with the second metal component.

* * * * *